United States Patent
Sato

(10) Patent No.: US 7,436,451 B2
(45) Date of Patent: Oct. 14, 2008

(54) IMAGE SENSING APPARATUS AND ITS CONTROL METHOD

(75) Inventor: Keiji Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 729 days.

(21) Appl. No.: 10/925,168

(22) Filed: Aug. 24, 2004

(65) Prior Publication Data
US 2005/0046738 A1   Mar. 3, 2005

(30) Foreign Application Priority Data
Aug. 25, 2003   (JP)   ............................. 2003-300050

(51) Int. Cl.
*H04N 5/238* (2006.01)
*H04N 9/64* (2006.01)
(52) U.S. Cl. ...................................... 348/363; 348/246
(58) Field of Classification Search ................. 348/363, 348/246, 274, 364, 366
See application file for complete search history.

(56) References Cited

U.S. PATENT DOCUMENTS

| 5,416,516 A | * | 5/1995 | Kameyama et al. | ......... 348/246 |
| 5,926,218 A | * | 7/1999 | Smith | ..................... 348/207.99 |
| 6,639,626 B1 | * | 10/2003 | Kubo et al. | .............. 348/218.1 |
| 6,683,643 B1 | * | 1/2004 | Takayama et al. | ........... 348/247 |
| 2002/0030749 A1 | * | 3/2002 | Nakamura et al. | ........... 348/222 |
| 2003/0117501 A1 | * | 6/2003 | Shirakawa | ............... 348/218.1 |

FOREIGN PATENT DOCUMENTS

| JP | 11-146242 | * | 5/1999 |
| JP | 2000-59690 | | 2/2000 |
| JP | 2001-222039 | | 8/2001 |
| JP | 2002-94862 | | 3/2002 |
| JP | 2002-152601 | | 5/2002 |
| JP | 2003-209749 | | 7/2003 |

OTHER PUBLICATIONS

Patent Abstracts of Japan English Abstract for JP 11-146242.
Partial English translation of JPA2003-209749 for paragraphs [0026] and [0027].
An Office Action from the Japanese Patent Office dated Aug. 3, 2007 for Japanese Patent Application No. 2003-300050 and English Translation of the same.
Partial English translation of JPA 2001-222039.

* cited by examiner

*Primary Examiner*—Nhan T Tran
(74) *Attorney, Agent, or Firm*—Morgan & Finnegan, LLP

(57) ABSTRACT

An image sensing apparatus in which time required before the apparatus becomes in an image-sensing possible status is reduced. The image sensing apparatus has a constituent element comprising a first image sensing unit as a main unit and a constituent element comprising a second image sensing unit as a sub unit, having a structure more simple than that of the first image sensing device. An aperture amount in an initial stage of an aperture unit when the first image sensing unit is enabled to perform image sensing is determined based on a light amount detected by a light amount detector in the second image sensing unit and an F value of the first image sensing unit.

11 Claims, 9 Drawing Sheets

IMAGE SENSING APPARATUS AND ITS CONTROL METHOD

FIELD OF THE INVENTION

The present invention relates to an image sensing apparatus having a solid-state image sensing device, and more particularly, to an apparatus having a first main camera system and a second sub camera system.

BACKGROUND OF THE INVENTION

FIG. 2 is a block diagram showing an example of a conventional image sensing apparatus having a solid-state image sensing apparatus. In FIG. 2, reference numeral 21 denotes a lens unit; 22, an aperture unit to control the amount of light outputted from the lens unit 21; 23, a CCD solid-state image sensing device (hereinbelow, simply referred to as a "CCD") having an array of photoelectric transducers, to obtain an image by focusing of light obtained via the lens unit 21 under the control of a CCD driver 28; 24, a camera signal processor to sequentially process a signal outputted from the CCD 23 and convert the signal into a video signal image; 25, a video signal processor to control a display unit 27 provided in the image sensing apparatus and convert a video signal outputted from the camera signal processor 24 to a signal in a format to be displayed on the display unit 27; 26, a system controller to detect an ON/OFF status of a main power switch 29 and control the lens unit 21, the aperture unit 22, the CCD driver 28 and the video signal processor 25 thus control the entire apparatus.

In an apparatus using a solid-state image sensing device, if a defective pixel due to a partial crystal defect of the solid-state image sensing device known as a white flaw is detected, the flaw is compensated with signals outputted from elements of peripheral pixels, as disclosed in Japanese Published Unexamined Patent Application No. 2002-152601. The defective element must be detected by blocking incident light from the lens unit. Next, control performed by the system controller 26 when the white flow detection procedure is performed in the image sensing apparatus shown in FIG. 2 will be described with reference to a flowchart of FIG. 5.

First, the system controller 26 monitors the status of the apparatus power switch 29, and when an apparatus power ON operation has been detected, controls the respective blocks in the apparatus to initial statuses (step S1). Next, the system controller 26 instructs the video signal processor 25 to perform mute setting processing to display a predetermined video raster image or the like in place of an image obtained by image sensing on the display unit 27 (step S2). Next, the system controller 26 controls the aperture unit 22 to completely close, to block incident light from the lens unit 21 (step S3). In this status, the well-known CCD flaw detection processing and determination of adjacent elements to be utilized upon detection of flaw are performed (step S4). Next, the system controller 26 releases the aperture unit 22 (step S5), and starts control by the aperture unit 22 so as to control the amount of light incident on the CCD 23 to an appropriate level (step S6). When the light amount has been controlled to the appropriate level by the aperture unit 22, the system controller 26 controls the video signal processor 25, to release the mute setting with the video raster signal or the like on the display unit 27 and display an image obtained by image sensing formed on the CCD 23 on the display unit 27 (step S7).

As described above, in the image sensing apparatus, upon power-on, the initialization processing and the white flow detection processing on the solid-state image sensing device, and further, processing to determine an aperture amount in an initial stage (hereinbelow referred to as "initial aperture-amount computation processing") are required. FIG. 3 shows the relation among these processings.

FIG. 3 shows time series apparatus statuses when the power is ON. A period A is time required for initialization of the respective blocks immediately after the apparatus power ON; a period B, time required for the above-described CCD flaw detection and setting of correction upon detection of flaw; and a period C, time required for initial aperture-amount computation to control the amount of incident light from the lens unit 21 via the aperture unit 22 to the CCD 23 to an appropriate level.

The initial aperture-amount computation processing is in exclusive relation with the above-described CCD flaw detection control since the initial aperture-amount computation processing is performed by detecting the amount of incident light from the lens unit 21 by the CCD 23. To maintain high image quality, the CCD flaw detection and correction setting processing are indispensable, accordingly, the time from the apparatus power ON to output of image obtained by image sensing on the display unit is "period A+period B+period C", which is not negligible.

Note that when the initial aperture-amount computation processing has been completed, as the amount of aperture in the aperture unit 22 in the initial stage is determined, normal AE processing is performed thereafter, then the apparatus enters an image sensing status, and recording is performed in accordance with necessity. However, recording is not performed simultaneously with the start of the AE processing. That is, generally, when the apparatus becomes in an image-sensing possible status, an image is displayed on a display device such as a finder, and the display of a subject image is checked and then a recording button is operated. Accordingly, the initial aperture amount upon start of AE processing, i.e., the initial aperture-amount computation processing is necessary, but high accuracy is not required in the processing.

SUMMARY OF THE INVENTION

The present invention has been made in consideration of the above situation, and provides a technique of reducing time required before the image sensing apparatus becomes in an image-sensing possible status.

To solve the above problem, the present invention provide an image sensing apparatus having the following construction. That is, provided is an image sensing apparatus having first image sensing unit as a main unit and a second image sensing unit as a sub unit, comprising:

a light amount detection unit, provided in the second image sensing unit, to detect a light amount; and an initial light amount determination unit to determine an aperture amount to control light amount in an initial stage of an image sensing mode by the first image sensing unit, based on information on the light amount detected by the light amount detection unit, wherein the first image sensing unit is set with the aperture amount determined by the initial light amount determination unit, thereby the apparatus enters an image-sensing possible status.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

First Embodiment

Figure 9:
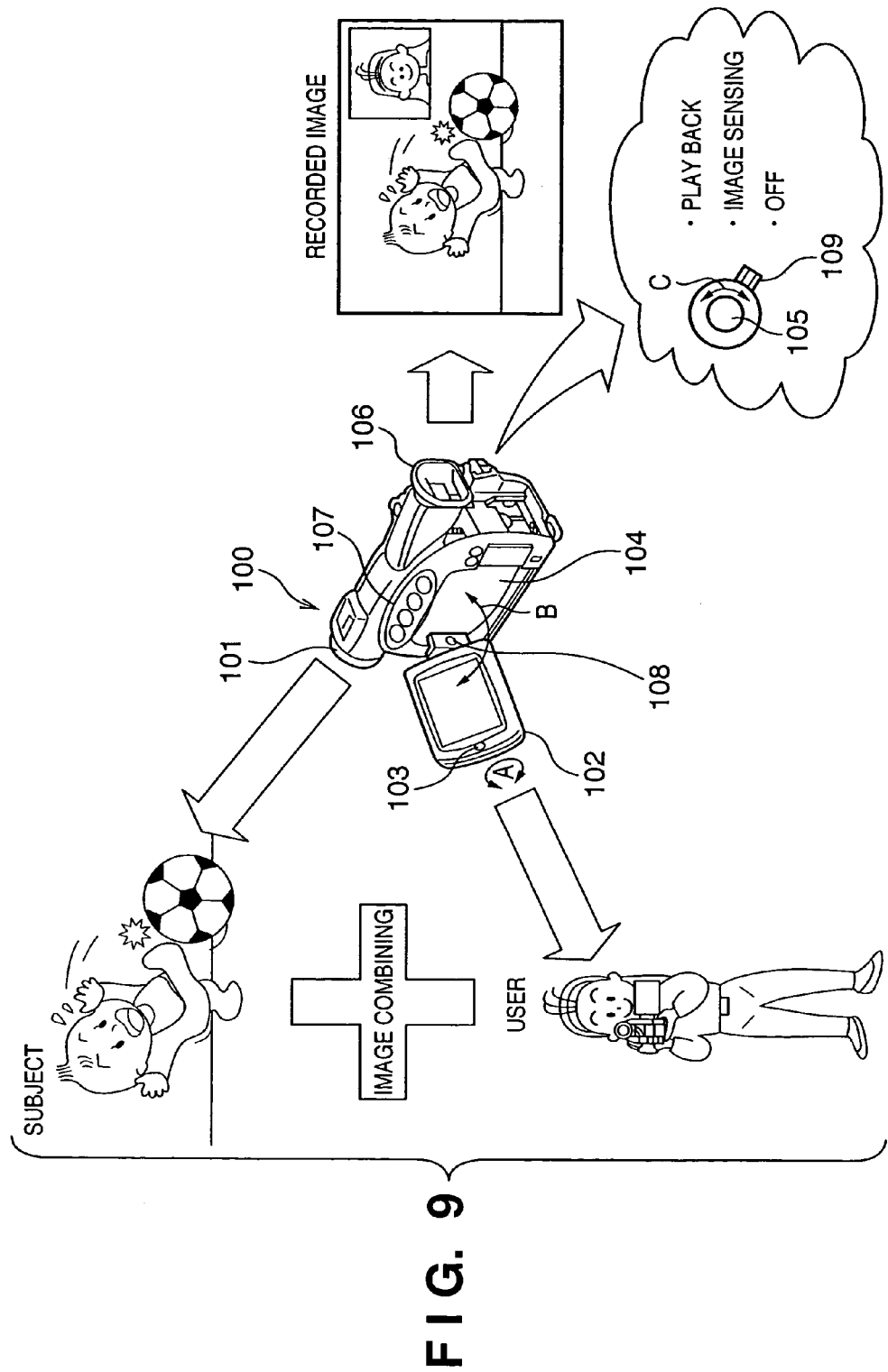
FIG. 9 is an explanatory view showing appearance and functions of the image sensing apparatus according to the embodiments.

FIG. 9 shows appearance and functions of a digital video camera apparatus (hereinbelow, simply referred to as a "video camera") 100 as a preferred embodiment of the present invention.

In FIG. 9, numeral 101 denotes a main camera 101 to function as a general video camera; 106, a viewer including a display device; and 105, a recording button to designate start/end of recording. While the recording button 105 is depressed, recording on a recording medium (not shown) (in the embodiments, it is a video tape cassette, however, it may be an optical disk, a semiconductor storage medium or the like) is performed. At normal times, an operator looks inside the viewer 106 to check an image being sensed by the main camera 101 while depresses (turns ON) the recording button 105, to record an image obtained during the period where the recording button has been depressed on the recording medium. Numeral 109 denotes a rotary type switch in which the angular position of a projection member is changed along an arrow C direction to select any of power OFF, an image sensing mode in power ON status, and a playback mode in power ON status.

Numeral 102 denotes a display panel to display an image, if in the image sensing mode, being obtained by image sensing, or an already obtained image if in the playback mode. Accordingly, as means for checking an image obtained by image sensing, the display panel 102 can be used in addition to the viewer 106. Note that when the display panel 102 is not used, the bearing of the display panel 102 is rotated along an arrow B direction, thereby the display panel 102 can be stored in panel storage space (concavity) 104 of the apparatus main body. Further, when the display panel 102 is exposed, the operator can check a display image at a convenient angle by rotating the display panel 102. along an arrow A direction.

Numeral 103 denotes a sub camera provided on the display panel 102. When the function of the sub camera 103 is enabled, an image obtained by the sub camera 103 can be inserted in a part of an image obtained by the main camera 101 (hereinbelow, this format will be referred to as a "picture-in-picture format") as shown in FIG. 9, and further, the combined image can be recorded on the recording medium.

Numeral 107 denotes a switch group to select one of various image sensing modes, to designate feeding/rewind upon playback or the like, including a switch to enable/disable the function of the sub camera 103.

Note that when the display panel 102 is stored in the storage space 104 of the main body, the above-described picture-in-picture display does not function. For this function, to determine whether or not the display panel 102 is stored in the storage space 104, a display panel open/close detection switch 108 is provided in the storage space 104. When the display panel 102 is set in the storage space 104, the switch 108 is pushed and turned ON.

In the above construction, when the image sensing mode is set, the display panel is exposed to outside, and the picture-in-picture mode is selected, an image obtained by the sub camera 103 (e.g., an image of the operator) is superposed in the image of the subject obtained by the main camera 101 and displayed as shown in FIG. 9. Accordingly, in this situation, when the recording button 105 is depressed, an image combined from images obtained by two cameras is recorded on the recording medium.

Next, the construction and processings of the video camera 100 according to the present embodiment will be described with reference to FIG. 1.

Figure 1:
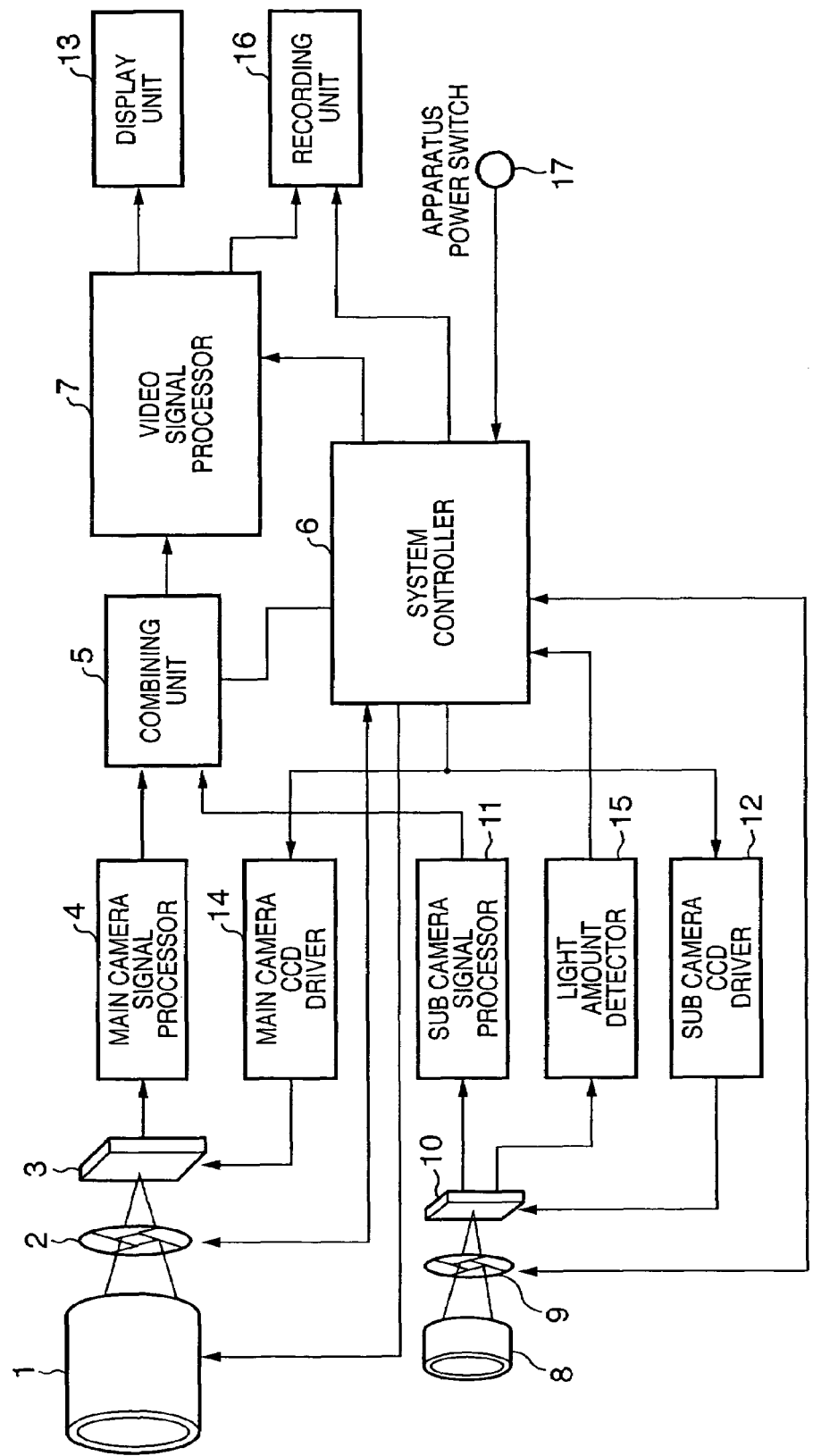
FIG. 1 is a block diagram of an image sensing apparatus according to a first embodiment of the present invention.
Figure 2:
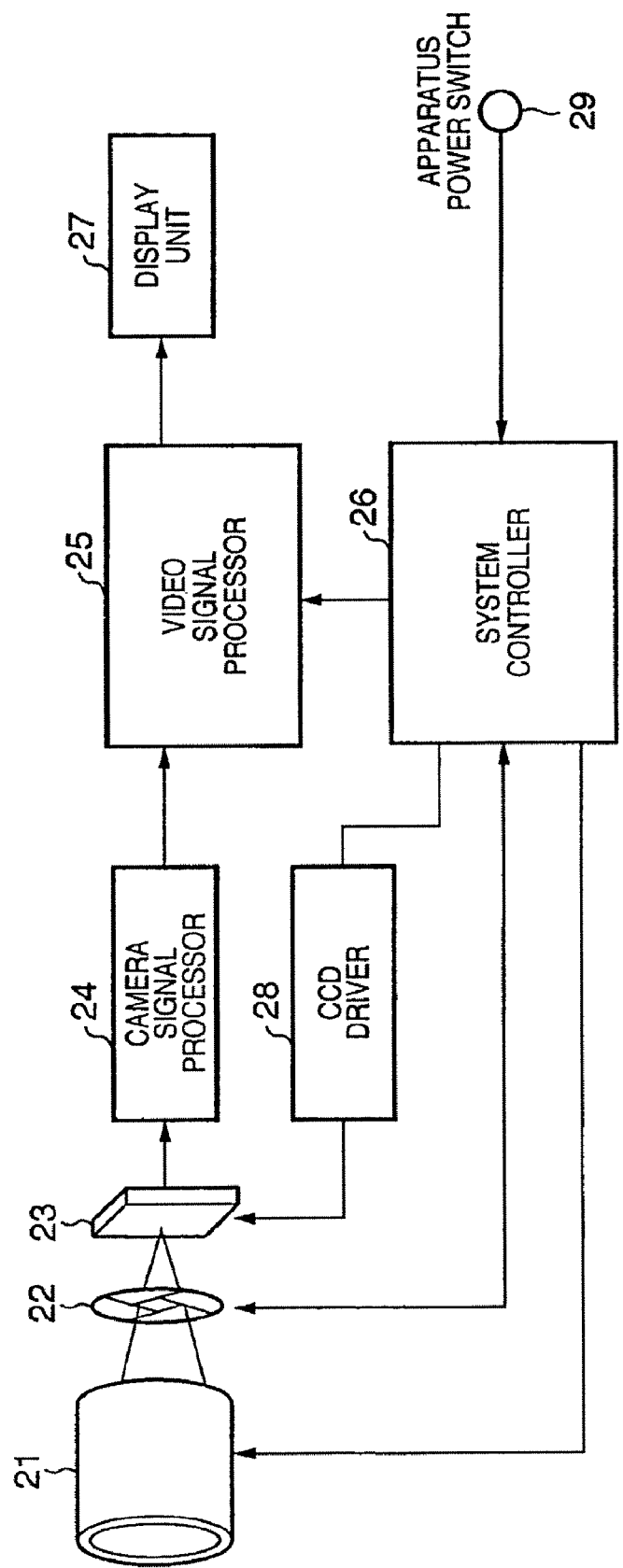
FIG. 2 is a block diagram showing the conventional image sensing apparatus.

In FIG. 1, numeral 1 denotes a main camera lens unit; 2, a first aperture unit to control the amount of light outputted from the main camera lens unit 1; 3, a main camera CCD (solid-state image sensing device) with an array of photoelectric transducers, to output an image, obtained by focusing of light obtained via the first aperture unit 2, as an electric signal, under the control of a main camera CCD driver 14; and 4, a main camera signal processor to sequentially process the signal outputted from the main camera CCD 3 and convert the signal to a video signal image. The main camera signal processor 4 also performs detection of defective pixel of the main camera CCD 3 (white flaw detection) and upon detection of defective element, generation of image signal using pixel group around to the defective pixel in place of a signal from the defective pixel, in accordance with instructions from the system controller. The main camera 101 is constituted with these elements.

Numeral 8 denotes a sub camera lens unit; 9, a second aperture unit to control the amount of light outputted from the sub camera lens unit 8; 10, a sub camera CCD (solid-state image sensing device) with an array of photoelectric transducers, to convert an image, obtained by focusing of light obtained via the second aperture unit 9, to an electric signal, under the control of a sub camera CCD driver 12; 11, a sub camera signal processor to sequentially process the signal outputted from the sub camera CCD 10 to convert the signal to a video signal image; and 15, a light amount detector to detect the amount of light incident on the sub camera CCD 10 and output the result of detection. The sub camera 103 is constituted with these elements.

Note that the sub camera 103 of the embodiment has a simple structure for convenience of installation position or the like, and it lacks a zoom function owned by the main camera 101. Further, the number of image sensing pixels is smaller than that of the main camera. However, these are mechanical problems and if they can be solved, the sub camera 103 may have equivalent functions to those of the main camera 101.

Numeral 5 denotes a combining unit to combine the signal outputted from the main camera signal processor 4 with the signal outputted from the sub camera signal processor 11 or select only the signal outputted from the main camera signal processor 4 (or only the signal outputted from the sub camera signal processor 11), in accordance with a control signal from the system controller 6, and output the result of combining or selection to the subsequent block.

Numeral 7 denotes a video signal processor to generate an image signal for display and recording based on the output signal from the combining unit 5. The video signal processor 7 has a function of generating various message information as a video signal in accordance with an instruction signal from the system controller 6. The signal generated by the video signal processor 7 is outputted to a display unit 13 (corresponding to the liquid crystal display provided in the display panel 102 or the viewer 106 in FIG. 9) and a recording unit 16 to perform recording on the recording medium.

The system controller 6 comprises a CPU, a ROM holding a process procedure (program) for the CPU, and a RAM utilized as a work area. The system controller 6 controls the entire apparatus, and monitors the various switch statuses and the status of a power switch 17 (corresponding to the switch 109 in FIG. 9). In the image sensing mode, a video signal is outputted to the display unit 13 to display an image obtained by image sensing. Further, the recording unit 16 records an image obtained by image sensing onto the recording medium (not shown) only when an instruction signal to perform recording operation has been inputted from the system controller 6. Further, the system controller 6 controls the main camera lens unit 1, the first aperture unit 2, the main camera CCD 4, the sub camera lens unit 8, the second aperture unit 9, the sub camera CCD 11, the combining unit 5, and the video signal processor 7. Further, the system controller 6 performs various processings based on a signal from the light amount detector 15 in the sub camera (the details will be described later).

As described above, the video camera 100 of the embodiment has two cameras, the main camera 101 and the sub camera 103. A main video image is obtained by the main camera 101, and an image obtained by the sub camera 103 is a comparatively small image displayed in a sub screen in the main video image. The image quality of the sub image is not necessarily so high as that obtained by the main camera 101, and the number of pixels of the sub camera CCD 10 of the sub camera 103 is not so large as that of the main camera CCD 3.

Accordingly, in consideration of time from the apparatus power ON to a point at which the sub camera 103 becomes in an image-sensing possible status, initialization of respective circuits related to the sub camera 103 is required, however, white flaw detection in the sub camera CCD 10 may be omitted without any problem, and the initial aperture-amount computation processing in the sub camera can be simplified. Thus the sub camera can become in the image-sensing possible status in very short time.

On the other hand, as the main camera 101 must maintain high image quality, all the initialization, white flaw detection and correction, and the initial aperture-amount computation processing must be performed.

Accordingly, in a case where these two cameras are used in image sensing, the time from the apparatus power ON to the point at which the apparatus becomes in an image-sensing possible status (before an image obtained by image sensing is displayed on the display unit 13) is equal to the time from the power ON to the point at which the main camera 101 becomes in an image-sensing possible status. In other words, to reduce time from a point at which the user turned the power ON to a point at which the user can perform image sensing, the total time of the initialization, the white flow detection and correction processing, and the initial aperture-amount computation processing is reduced.

Considering that among these processings, the initialization processing cannot be omitted, and the white flaw detection and correction processing is inevitable processing to maintain high image quality in the main camera 101, the present embodiment provides a technique to omit or reduce the time for the initial aperture-amount computation processing.

Next, the initial aperture-amount computation processing will be briefly described.

Generally, when the power of a video camera is turned ON, it is utterly unknown whether the video camera is in a dark place or bright place, the diaphragm of aperture unit is full-opened, and the gain of the CCD is detected. If the gain is saturated, the control of the aperture unit is repeated, and an aperture amount to obtain an optimum gain (light amount) is detected. This processing is called "initial aperture-amount computation". Accordingly, during the period from the power ON to the detection of optimum light amount, as an image cannot be detected with high precision, recording cannot be performed. Further, generally, when display of image obtained by image sensing on the display unit (viewer or display panel) is started, the user is notified that image sensing and recording can be performed. Accordingly, nothing is displayed on the display unit 13 during the initial aperture-amount computation processing. When the initial aperture-amount computation processing has been completed, the first aperture unit is controlled with the aperture amount upon completion of the processing as an initial value and the display on the display unit 13 is started. Thereafter, well-known AE processing different from the initial aperture-amount computation processing is performed. That is, real-time control (feedback control) is performed on the first aperture unit 2.

In the present embodiment, the "initial aperture-amount computation processing" in the main camera 101 is substantially omitted and the time from the power ON to the point where the apparatus becomes in an image-sensing possible status is reduced. For this purpose, an AE processing initial aperture value (a value set in the first aperture unit 2) when the main camera 101 becomes in an image-sensing possible status is determined based on the result of light amount detection by the sub camera 103 having a simple structure.

Figure 6:
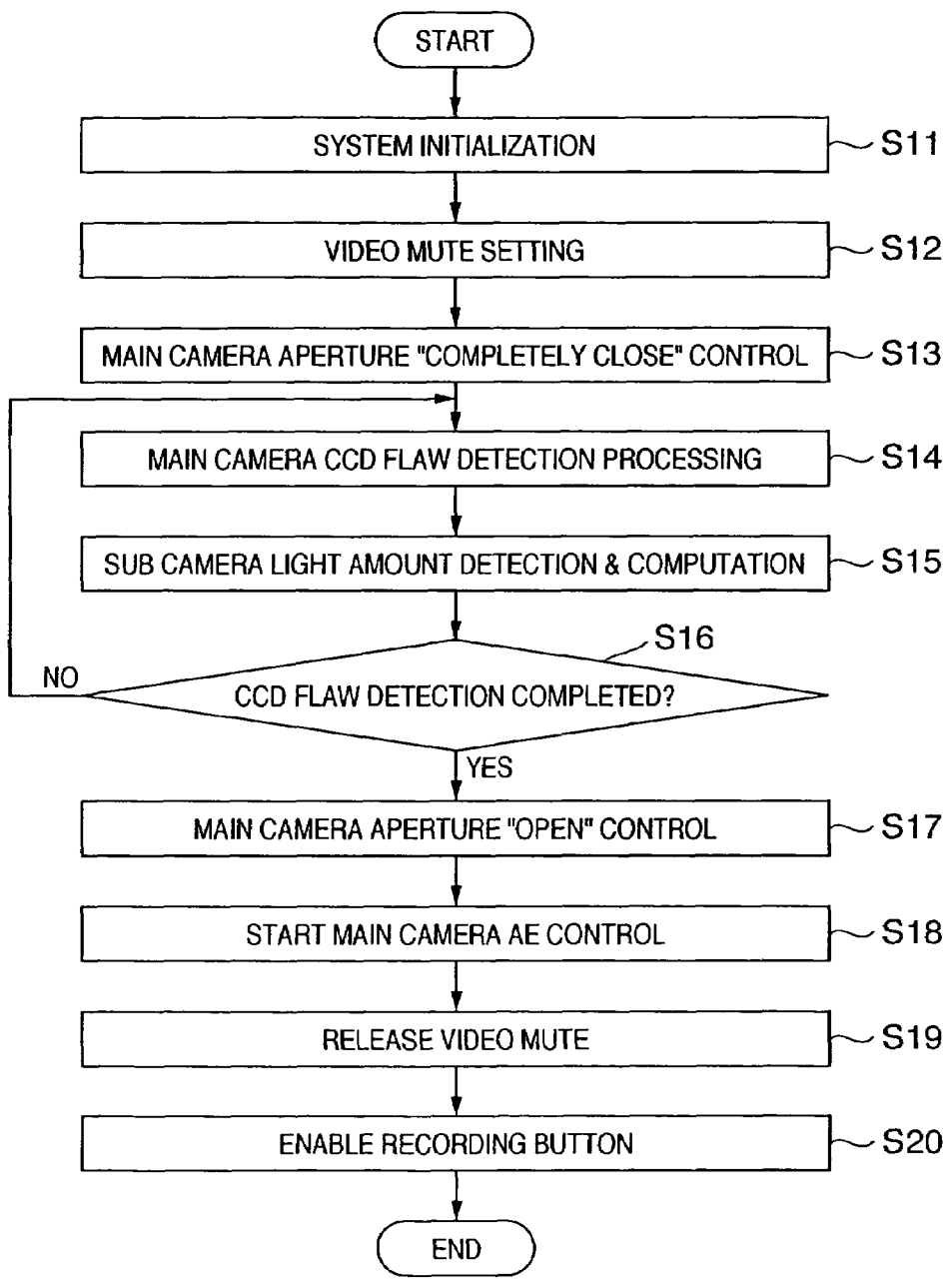
FIG. 6 is a flowchart showing a processing procedure according to the first embodiment.

Hereinbelow, the content of processing by the system controller 6 according to the present embodiment will be described with reference to the flowchart of FIG. 6.

First, at step S11, the system controller 6 monitors the status of the main power switch 17, and when an apparatus power ON operation has been detected, the system controller 6 controls the respective blocks in the apparatus to initial statuses, and controls the combining unit 5 to output a signal inputted from the main camera signal processor 4 to the video signal processor 7.

Next, at step S12, the system controller 6 controls the video signal processor 7 to display a video raster image on the display unit 13, and outputs a mute command signal. Then at step S13, the system controller completely close the first aperture unit 2, thus blocks light incident from the main camera lens unit 1.

When the above processing has been completed, the flow detection and correction processing in the main camera CCD 3 is started at step S14.

At step S15, the amount of light currently incident on the main camera lens unit 1 is assumed based on light amount information outputted from the light amount detector 15 in the sub camera 103, second aperture unit 9 setting information, and an F value of the main camera lens unit 1 and the like. Next, at step S16, it is determined whether or not the flow detection and correction processing in the main camera 101 started at step S14 has been completed. If it is determined that the processing has not been completed, the process returns to step S14 to repeat the above processing.

On the other hand, if it is determined that the flaw detection and correction processing in the main camera 101 has been completed, the process proceeds to step S17. At step S17, the initial aperture amount of the first aperture unit 2 in the main camera 101 is set based on the light amount assumed at step S15. Then at step S18, the process moves to general AE control on the first aperture unit 2 to always control the amount of light incident from the main camera lens unit 1 to the main camera CCD 3 to an appropriate level. Thereafter, at step S19, the video signal processor 7 is controlled to release mute setting to inhibit display by a video raster signal or the like to the display unit 13, thereby an image obtained by image sensing by the main camera CCD 3 with incident light from the main camera lens unit 1 is displayed on the display unit 13, and the user is notified that image sensing and recording can be performed. Then at step S20, the operation of the recording button 105 is enabled.

As processing thereafter, when the recording button 105 (FIG. 9) has been depressed, recording processing in the recording unit 16 is enabled, to record an image obtained by image sensing on the recording medium (not shown).

Figure 3:
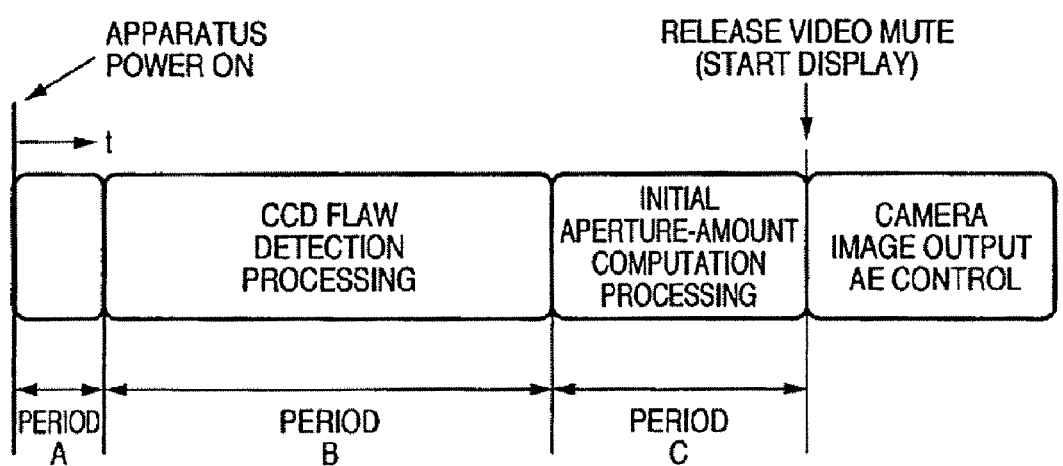
FIG. 3 is a timing chart showing the processing period from the apparatus power ON to camera image output in the conventional control.
Figure 4:
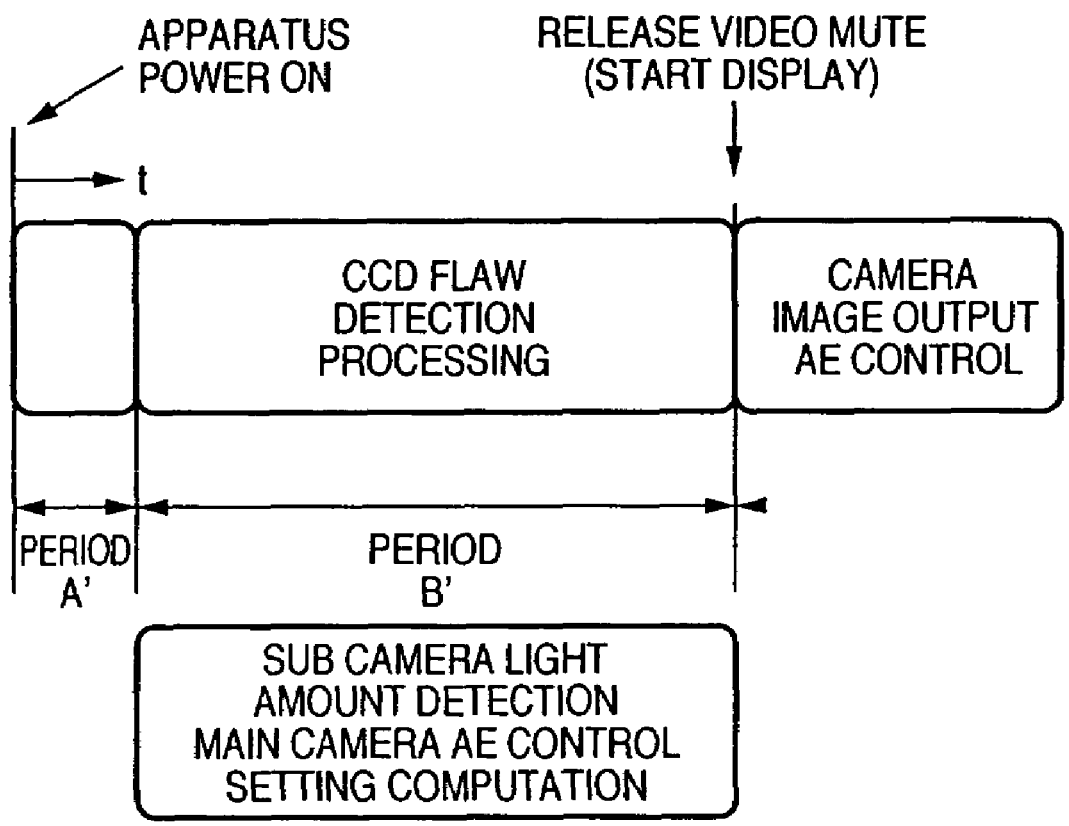
FIG. 4 is a timing chart showing the processing period from the apparatus power ON to camera image output in the apparatus according to the first embodiment.
Figure 5:
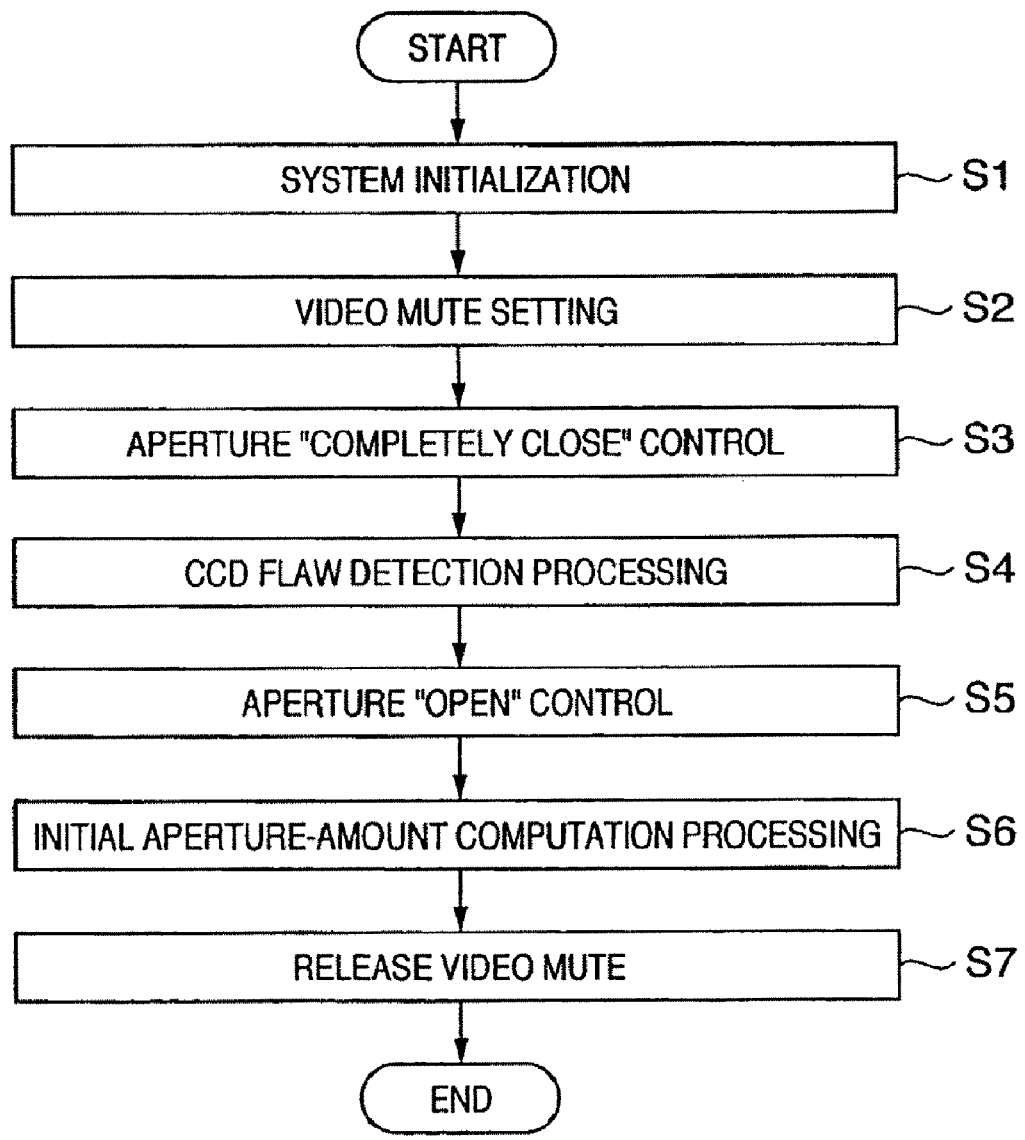
FIG. 5 is a flowchart showing a control processing procedure in FIG. 2.

As described above, according to the present embodiment, in an image sensing apparatus (video camera apparatus in the present embodiment) having two (plural) cameras (image sensing means), i.e., a main camera requiring high image quality and a sub camera in which the image quality is not so high as that of the main camera, the exposure status of the main camera in an initial stage is determined based on the amount of light in the sub camera, thereby the period of initial aperture-amount computation processing (corresponding to the period C in FIG. 3) can be omitted, thus the time required before the apparatus becomes in an image-sensing/recording possible status can be reduced.

Note that in the above description, the image sensing mode when the apparatus becomes in an image-sensing possible status may be a mode to perform sensing/recording an image only by the main camera 101 (main image sensing mode) or may be a mode to perform image sensing in the picture-in-picture format (picture-in-picture (PinP) mode) as shown in FIG. 9. Even in the main image sensing mode, the picture-in-picture image sensing can be applied if the display surface of the display panel 102 is exposed to the outside. However, if the display surface of the display panel 102 is stored in the panel storage space 104, the initial aperture-amount computation processing is performed instead of the processing in FIG. 6 as in the case of the conventional art.

Further, in the present embodiment, as shown in FIG. 9, the sub camera 103 is provided on the display panel 102 and there are two statuses, i.e., sub camera exposed and not exposed statuses. If the sub camera 103 is always exposed to the outside, the initial aperture-amount computation processing in the main camera 101 can always be omitted.

Further, the present embodiment has been described as a video camera apparatus, however, the present invention is applicable to any other image sensing apparatus as long as the apparatus has plural image sensing means and one of the image sensing means has a simple structure and high image quality is not required of it. Accordingly, the present invention is not limited to the above embodiment. For example, an increasing number of cellular phones have a digital camera, and the present invention is applicable to a case where plural image sensing devices (image sensing means) are provided (such that one means performs image sensing in a direction toward an operator, while the other one means performs image sensing in an opposite direction) in such cellular phone.

Further, in the above present embodiment, the flaw detection and correction processing and the initial aperture-amount computation processing are not performed in the sub camera 103. However, the present invention is not limited to this arrangement. For example, the flaw detection and correction processing and the initial aperture-amount computation processing may be performed in the sub camera 103 as in the case of the main camera. As the time required for the flaw detection is proportional to the number of image sensing elements, as long as the flaw detection and correction processing and the initial aperture-amount computation processing are completed before the completion of the flaw detection and correction processing in the main camera 101, the high response in the entire apparatus can be maintained in a case where the initial aperture-amount computation processing is performed by using the light amount information obtained in the sub camera 103. That is, if the timing of transition to an image-sensing possible status in the sub camera 103 is earlier than that in the main camera 101, the same advantage as that of the above embodiment can be attained.

Further, in the present embodiment, the time from the power ON to the point at which image-sensing becomes possible is reduced, however, the start of the period is not limited to the power ON time, since in a case where the power is turned ON in the playback mode, the above-described processings are performed when the image sensing mode is selected. Accordingly, the power-ON time means time when an operation of switching from an image-sensing impossible status to an image-sensing possible status is started, and can translate to an initial stage of the image sensing mode.

Second Embodiment

Figure 7:
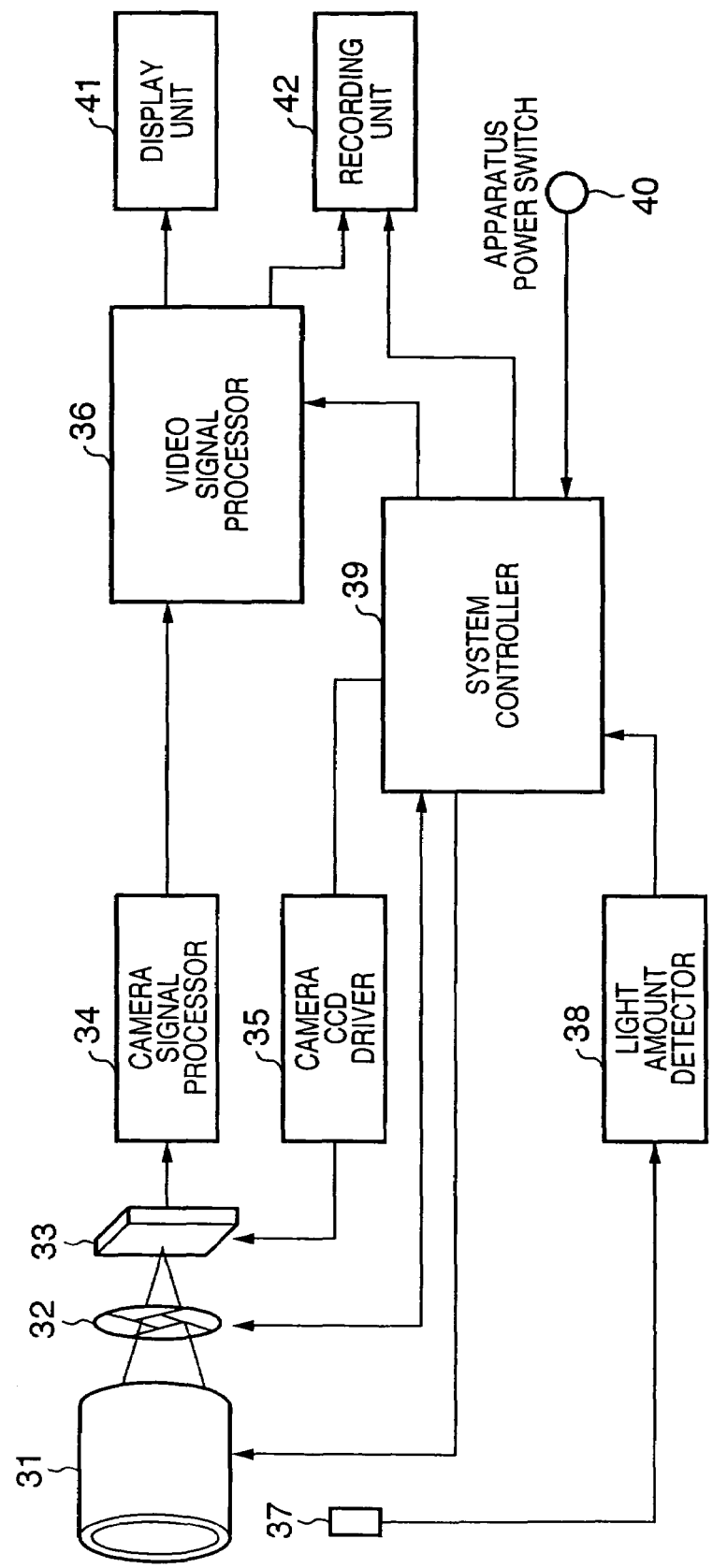
FIG. 7 is a block diagram showing the image sensing apparatus according to a second embodiment of the present invention.

FIG. 7 is a block diagram showing the image sensing apparatus according to a second embodiment of the present invention.

In FIG. 7, numeral 31 denotes a camera lens unit; 32, an aperture unit to control the amount of light outputted from the camera lens unit 31; 33, a camera CCD (solid-state image sensing device) with an array of photoelectric transducers, to convert an image, obtained by focusing of light obtained via the aperture unit 32, to an electric signal, under the control of a camera CCD driver 35; and 34, a camera signal processor to sequentially process the signal outputted from the camera CCD 33 and convert the signal to a video signal image.

Numeral 36 denotes a video signal processor to output video signals respectively appropriate to a display unit 41 provided in the apparatus and a recording unit 42, from a signal obtained by image sensing; and 39, a system controller, including a CPU, a ROM holding a processing procedure (program) for the CPU, and a RAM as a work area for the CPU, to control the entire apparatus. The system controller 39 mainly controls the camera lens unit 31, the aperture unit 32, the camera CCD driver 35, the display unit 41 and the recording unit 42. The system controller 39 has a function of detecting statuses of various switches including a main power switch 40.

Numeral 37 denotes an optical sensor to detect the outside brightness around the camera lens unit 31; and 38, a light amount detector to detect the amount of light incident on the optical sensor 37 and output the light amount to the system controller 39. The optical sensor 37 detects the brightness of a place where the apparatus is installed. It is preferable that the optical sensor 37 is provided around the camera lens unit 31 as image sensing means, since there is a high possibility that a subject exists in a direction facing the camera lens unit and the brightness information in the direction is significant.

Figure 8:
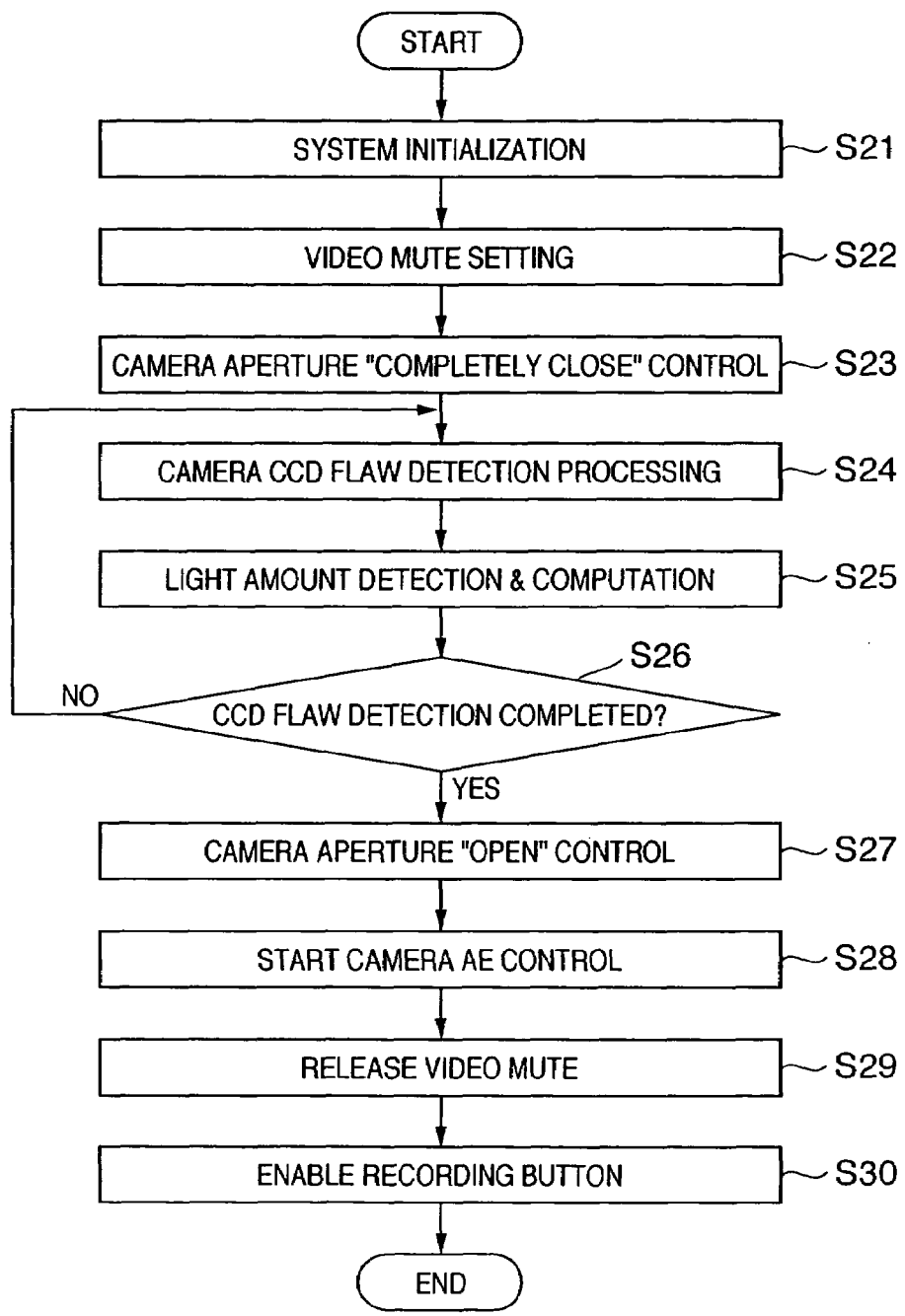
FIG. 8 is a flowchart showing the processing procedure according to the second embodiment.

Next, the content of processing by the system controller 39 shown in FIG. 7 will be described with reference to the flowchart of FIG. 8.

First, at step S21, the system controller 39 monitors the status of the main power switch 40. When an apparatus power ON operation has been detected, the system controller 39 controls respective blocks to initial statuses. Next, at step S22, the system controller 39 outputs a mute request signal (output inhibition command signal) to mute a video raster image signal to the video signal processor 36, and at step S23, completely closes the aperture unit 32, thereby blocks light incident from the camera lens unit 31.

Next, at step S24, the flaw detection and correction processing is started in the camera CCD 33. At step S25, the amount of light currently incident from the camera lens unit 31 is assumed based on the light amount information outputted from the light amount detector 38 and an F value of the camera lens unit 31. Then at step S26, it is determined whether or not the flaw detection and correction processing started at step S24 has been completed. If it is determined that the processing has not been completed, the processing at step S24 and the subsequent steps is repeated.

Further, if it is determined that the flaw detection and correction processing has been completed, the process proceeds to step S27. At step S27, an initial aperture value in the aperture unit 32 is determined based on the light amount assumed at step S25, and the unit is controlled to have the aperture amount. Then, at step S28, the process moves to general AE control so as to control the aperture unit 32 to always control the amount of light incident from the lens unit 31 to the camera CCD 33 to an appropriate level. At step S29, to notify that image sensing/recording has become possible, the mute setting in the video signal processor 36 is released, and the display of image obtained by image sensing is started. Then at step S30, the recording button is enabled.

As described above, according to the second embodiment, the time required before the point where the image sensing/recording has become possible can be reduced by the omission of the initial aperture-amount computation processing as in the case of the first embodiment.

Note that the first and second embodiments have been applied to a video camera and only elements related to image sensing have been described, however, an audio signal can be also recorded as in the case of a general video camera. Since audio information is not directly related to the present invention, the description thereof has been omitted but recording thereof is not excluded.

Further, the object of recording by the recording by the recording units 16 and 42 in FIGS. 1 and 7 may be any medium such as a video tape, a disk, a memory card or an internal memory device. Further, a medium based on a method to perform compression coding upon recording such as MPEG may be used.

As described above, according to the present invention, in an image sensing apparatus, time required before image sensing by image sensing means becomes possible can be reduced. Particularly, in an apparatus having plural image sensing means such as main image sensing means and sub image sensing means, an initial aperture amount of AE processing in the main image sensing means is determined by utilizing information on the sub image sensing means, thereby the initial aperture-amount computation processing in the main image sensing means is omitted. Thus time required before image sensing becomes possible can be reduced.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-300050 filed on Aug. 25, 2003, which is hereby incorporated by reference herein.

What is claimed is:

1. An image sensing apparatus having first image sensing unit and a second image sensing unit, comprising:
    an aperture unit which controls the amount of incident light to said first image sensing unit, but does not control the amount of light to said second image sensing unit;
    a light amount detection unit, provided in said second image sensing unit, to detect a light amount;
    an initial light amount determination unit to determine an aperture amount to control light amount in an initial stage of an image sensing mode by said first image sensing unit, based on information on the light amount detected by said light amount detection unit; and
    an interpolation unit to detect a defective portion in said first image sensing unit by completely closing said aperture unit and, if the defective portion is detected, to interpolate a pixel signal of the defective portion using pixel signals around the defective portion,
    wherein said light amount detection unit detects the amount of light inputted to said second image sensing unit while said interpolation unit detects the defective portion, and said initial light amount determination unit determines the aperture amount in the initial stage when the detection of defective portion by said interpolation unit has been completed.

2. The image sensing apparatus according to claim 1, wherein the number of detectable pixels of said first image sensing unit is larger than that of said second image sensing unit.

3. The image sensing apparatus according to claim 1, wherein said second image sensing unit is provided in a display panel of said image sensing apparatus.

4. The image sensing apparatus according to claim 1, further comprising a display panel to display an image obtained by said first image sensing unit and an image obtained by said second image sensing unit.

5. The image sensing apparatus according to claim 4, wherein, in the display panel, the image obtained by said second image sensing unit is displayed within the image obtained by said first image sensing unit.

6. The image sensing apparatus according to claim 1, wherein if said light amount detection unit of said second image sensing unit does not function, said first image sensing unit determines an automatic exposure (AE) initial aperture amount based on a light amount obtained by an image sensing device of said first image sensing unit.

7. A control method for an image sensing apparatus having first image sensing unit, a second image sensing unit, an aperture unit which controls the amount of incident light to said first image sensing unit, but does not control the amount of incident light to said second image sensing unit and a light amount detection unit, provided in said second image sensing unit, to detect a light amount, comprising:

an initial light amount determination step of determining an aperture amount to control light amount in an initial stage of image sensing mode by said first image sensing unit, based on information on the light amount detected at said detection step; and an interpolating step of detecting a defective portion in said first image sensing unit by completely closing said aperture unit and, if the defective portion is detected, interpolating a pixel signal of the defective portion using pixel signals around the defective portion, wherein said light amount detection unit detects the amount of light inputted to said second image sensing unit during detecting the defective portion in said interpolation step, and, in said initial light amount determination step, the aperture amount in the initial stage is determined when the detection of defective portion in said interpolating step has been completed.

8. An image sensing apparatus having:
   a first image sensing unit;
   an aperture unit to control the amount of light to said first image sensing unit;
   a second image sensing unit to which the amount of incident light is not controlled by said aperture unit;
   a light amount detection unit to detect the amount of incident light to said second image sensing unit;
   a defective portion detecting unit to detect a defective portion in said first image sensing unit; and
   a control unit to, when a defective portion detecting unit detects a defective portion in said first image sensing unit, control said aperture unit so as to shading a light to said first image sensing unit during said light amount detection unit detects the amount of incident light to said second image sensing unit, and, after said defective portion detecting unit completes the processing of detecting the defective portion, control said aperture unit in accordance with the result of detection of the light amount by said light amount detection unit.

9. The apparatus according to claim 8, wherein said control unit shades the light to said first image sensing unit by completely closing said aperture unit.

10. The apparatus according to claim 9, wherein said control unit controls said aperture unit in accordance with the result of detection of light amount by said light amount detection unit only when opening said aperture unit having been closed so the defective portion is detected by said defective portion detecting unit.

11. A control method of an image sensing apparatus having a first image sensing unit, an aperture unit to control the amount of light to said first image sensing unit, and a second image sensing unit to which the amount of incident light is not controlled by said aperture unit, said method comprising:

a light amount detection step of detecting the amount of incident light to said second image sensing unit;

a defective portion detecting step of detecting a defective portion in said first image sensing unit; and a control step of, when a defective portion detecting unit detects a defective portion in said first image sensing unit, controlling said aperture unit so as to shading a light to said first image sensing unit during said light amount detection step of detecting the amount of incident light to said second image sensing unit, and, after the processing in said defective portion detecting step is completed, control said aperture unit in accordance with the result of detection of the light amount in said light amount detection step.

* * * * *